United States Patent [19]

Endres et al.

[11] Patent Number: 4,957,568
[45] Date of Patent: Sep. 18, 1990

[54] COMPOSITION AND PROCESS FOR ACTIVATING METAL SURFACES PRIOR TO ZINC PHOSPHATING AND PROCESS FOR MAKING SAID COMPOSITION

[75] Inventors: Helmut Endres; Peter Christophliemk; Karl-Dieter Brands; Wolf-Achim Roland; Joerg Riesop, all of Duesseldorf, Fed. Rep. of Germany

[73] Assignee: Henkel Kommanditgesellschaft auf Aktien, Duesseldorf, Fed. Rep. of Germany

[21] Appl. No.: 345,063

[22] Filed: Apr. 28, 1989

[30] Foreign Application Priority Data

Apr. 28, 1988 [DE] Fed. Rep. of Germany ....... 3814287

[51] Int. Cl.$^5$ .............................................. C23C 16/02
[52] U.S. Cl. .................. 148/254; 106/286.4; 106/287.19; 106/436
[58] Field of Search ............. 148/254; 106/436, 286.1, 106/286.4, 287.19; 252/174.25

[56] References Cited

U.S. PATENT DOCUMENTS

| | | | |
|---|---|---|---|
| 2,310,239 | 2/1943 | Jernstedt | 148/254 |
| 2,322,349 | 6/1943 | Jernstedt | 148/254 |
| 2,329,065 | 9/1943 | Lum | 148/254 |
| 2,331,196 | 10/1943 | Jernstedt | 148/254 |
| 2,342,738 | 2/1944 | Jernstedt | 148/254 |
| 2,456,947 | 12/1948 | Jernstedt | 148/254 |
| 2,490,062 | 12/1949 | Jernstedt | 148/254 |
| 2,874,081 | 2/1959 | Cavanagh et al. | 148/254 |
| 3,141,804 | 7/1964 | Gold et al. | 148/254 |
| 3,425,876 | 2/1969 | Steinbrecher | 148/254 |
| 3,510,365 | 5/1970 | Rausch | 148/254 |
| 3,728,163 | 4/1973 | Morrison | 148/254 |
| 3,741,747 | 6/1973 | Hamilton | 148/254 |
| 3,795,548 | 3/1974 | Hanser | 148/254 |
| 3,813,302 | 5/1974 | Morrison | 148/254 |
| 3,847,663 | 11/1974 | Shumaker | 148/254 |
| 3,864,139 | 2/1975 | Heller | 148/254 |
| 3,896,086 | 7/1975 | Haschke et al. | 260/67 |
| 3,923,742 | 12/1975 | Haschke et al. | 260/67 |
| 3,996,074 | 12/1976 | Rakestraw | 148/254 |
| 4,152,176 | 5/1979 | Guhde | 148/254 |
| 4,265,677 | 5/1981 | Müller et al. | 148/254 |
| 4,384,900 | 5/1983 | Gotta et al. | 148/254 |
| 4,427,459 | 1/1984 | Goltz | 148/254 |
| 4,497,667 | 2/1985 | Vashi | 148/254 |
| 4,517,030 | 5/1985 | Yamamoto | 148/254 |
| 4,539,051 | 9/1985 | Hacias | 148/254 |
| 4,678,519 | 7/1987 | Schapira | 148/254 |
| 4,698,269 | 10/1987 | Narusch | 148/254 |

FOREIGN PATENT DOCUMENTS

| | | | |
|---|---|---|---|
| 1144565 | 2/1963 | Fed. Rep. of Germany | 148/254 |
| 2154737 | 11/1971 | Fed. Rep. of Germany | . |
| 2931799 | 11/1980 | Fed. Rep. of Germany | . |
| 3213649 | 10/1983 | Fed. Rep. of Germany | . |
| 794717 | 5/1958 | United Kingdom | 148/254 |
| 1296412 | 11/1972 | United Kingdom | . |
| 2174719 | 11/1986 | United Kingdom | . |
| 2199850 | 7/1988 | United Kingdom | 148/254 |

OTHER PUBLICATIONS

POC Degussa, Umweltfreundliche Polycarbonsäuren mit Vielfältigen Anwendungsmöglichkeiten.

*Primary Examiner*—Jay H. Woo
*Assistant Examiner*—Jeremiah F. Durkin, II
*Attorney, Agent, or Firm*—Ernest G. Szoke; Wayne C. Jaeschke; Norvell E. Wisdom, Jr.

[57] ABSTRACT

Activation of metal surfaces prior to phosphating can be improved by using aqueous dispersions of polymeric titanium(IV) phosphates in which at least 95% by weight of the polymeric particles have a particle diameter of less than 200 nm. This low particle diameter is attained by adding a titanium(IV)-complexing agent before or during an otherwise conventional reaction between a titanium(IV) compound, acid or phosphate, and water. The complexing agent is used in an amount of less than the stoichiometric amount, based on the titanium(IV) content. The best complexing agents are poly(aldehydocarboxylic acids), 1,1-diphosphonic acids, and/or the alkali metal salts of these types of acids.

20 Claims, No Drawings

COMPOSITION AND PROCESS FOR ACTIVATING METAL SURFACES PRIOR TO ZINC PHOSPHATING AND PROCESS FOR MAKING SAID COMPOSITION

Field of the Invention

The invention relates to compositions having increased efficiency for the activation of surfaces of iron, steel, zinc, galvanized iron or steel, aluminum, its alloys, and steel coated with aluminum or its alloys prior to phosphating said surfaces with phosphating baths containing zinc ions, and more particularly prior to so-called low-zinc phosphating wherein the ratio of zinc ions to phosphate ions in the treatment solution is less than 1:12.

STATEMENT OF RELATED ART

Processes for producing phosphate layers on iron or steel surfaces by means of solutions of phosphoric acid containing various polyvalent metal cations and additives acting as accelerators (also called oxidants) are well established art. Such processes are used to achieve improved protection against corrosion, especially for automotive bodies. The phosphated surfaces are subsequently coated with paints, preferably by cathodic electrodeposition.

Materials commonly phosphated include most materials conventionally used in automotive body construction, such as iron or steel sheets, more recently also electrogalvanized or hot-galvanized steel, and materials having a surface composed of zinc alloys containing, for example, iron, nickel, cobalt or aluminum as alloying elements. Phosphating such surfaces for corrosion inhibition is usual not only in automobile manufacture but also in the manufacture of household appliances such as washing machines or refrigerators.

Prior to the phosphating treatment the work pieces are cleaned, rinsed and activated in order to obtain a thin and uniform phosphate layer, which is known to be one prerequisite for a good protection from corrosion. In the "high-zinc phosphating process" used for a long time it was possible in one process step to remove adherent oils, fats and other contaminants, including those due to machining, from the metal surface and at the same time to activate the metal surface for the following zinc phosphating step. Treatment baths for such a use have been described, for example, in the German Patent Specifications Nos. 2 951 600 and 3 213 649 as part of processes for pretreating metal surfaces prior to phosphating.

More recently, so-called "low-zinc" phosphating processes have been used to an increasing extent. Such processes are described, for example, in German Patent Specification No. 2 232 067. These processes, in combination with the usually following electrodeposited painting procedure, result in a clearly improved corrosion resistance. However, these processes are more sensitive to changes in the process parameters and to contaminants which are introduced into the phosphating bath with the sheets to be coated. Therefore, the step of activating the metal surface becomes much more significant than before. It has proven to be particularly advantageous to carry out the activation in a separate process step, subsequent to the step of cleaning and degreasing. This is all the more important if phosphating according to the low-zinc method is effected by a dipcoat procedure, but it is also true for zincphosphating by spraying or by combined spraying and dipcoating in either order The activation of the metal surface has the following objectives:

Increase of the rate of formation of crystal nuclei and, hence, of the number of nuclei, in the initial phase of zinc phosphating, which results in layer refinement The porosity of the desired zinc phosphate layer is reduced because the crystals are closely spaced. This results in the formation of a uniform and continuous zinc phosphate layer over the entire metal surface at a low surface area weight (indicated in grams of metal phosphate per 1 $m^2$ of metal surface), low surface area weights having proven to be beneficial as primer for paints.

Reduction of the minimum phosphating time, i.e., the time required to completely cover the metal surface with a continuous zinc phosphate layer These effects provided by the activating agent finally result in applied paint layers that are well anchored through the dense zinc phosphate layers containing fine particles and, thus, a good protection from corrosion will be attained, as is the main object of zinc phosphating.

As efficient activating agents having the required properties, the only known practical products have proven to be those which contain polymeric titanium-(IV) phosphate, such as those described by Jernstedt, for example in the U.S. Patent Specifications Nos. 2,456,947 and 2,310,239. Today, these activating agents are preferably used in a separate rinsing bath immediately prior to the zinc phosphating step; however, they may also be added to a cleaning bath, preferably a mildly alkaline one, used at an earlier stage in the process.

Although titanium(IV) phosphates will be generally formed upon the reaction of aqueous solutions of Ti(IV) salts with soluble phosphates or phosphoric acids, products having activating properties will be obtained only under specific preparation conditions which have been described in greater detail in the above-mentioned papers by Jernstedt, inter alia. The essential preparation parameters include:

Reaction of suitable titanium components with phosphoric acids or their alkali metal salts, preferably the latter, at a high phosphate excess in the presence of water at a temperature above 70 C.;

Use of titanyl sulfate, potassium hexafluorotitanate, titanium tetrachloride, titanium dioxide, potassium titanium oxide oxalate, or titanium disulfate as titanium components;

Use of mono-, di- or tri-sodium phosphate, pentasodium triphosphate or tetrasodium diphosphate or mixtures thereof as phosphate components;

Adjustment of the pH value into the range of 7 to 8, if required, with sodium carbonate, sodium hydroxide or sulfuric acid.

To meet the high requirements set by the users, and specifically by the automotive industry, only those titanium phosphates that have consistent quality and, thus, exhibit a reliable activation performance at a high bath capacity, which is expressed as activatable area per unit volume of the ready-to-use activating bath, will be acceptable.

In U.S. Patent Specification No. 2,310,239 it has been taught that even if constant reaction conditions are maintained, the quality, i.e., the desired activating action under practical conditions, of the titanium phosphates is subject to great variations from one batch to another. A multiplicity of subsequent patent specifications offer approaches to solve that problem. By way of example, there may be mentioned the German Patent Specifications No. 1 144 565 (alteration of the sequence of addition of the raw materials and control of the pH value prior to the reaction) and No. 2 931 799 (use of titanium dioxide that had been digested with molten sodium hydroxide as the titanium component).

The prior art processes for the preparation of activating titanium phosphates lead to products of inconsistent quality, which products allow only a short useful life of the activating baths. In EP-A-No. 0 180 523 it is taught to achieve an improvement by using phosphonic acids in the preparation of the activating bath, so that less expensive tap water can be used instead of the fully deionized water as usually required. In this process the concentration of the phosphonic acid in the ready-to-use activating bath is to be at least 10 ppm, and preferably at least 50 ppm.

It is an object of the present invention to provide polymeric titanium phosphates which have a particle size that is as small as possible. This additionally implies that the particle size distribution is narrow, because the distribution can be no larger than the largest particles. It is a further object of the present invention to provide such polymeric titanium(IV) phosphates which exhibit an enhanced efficiency for the activation of metal surfaces prior to phosphating these surfaces with phosphating baths containing zinc ions.

DESCRIPTION OF THE INVENTION

Except in the operating examples, or where otherwise expressly indicated to the contrary, all numbers in this description that specify amounts of materials or reaction or use conditions are to be understood as modified by the term "about".

The objects of the invention are attained by polymeric titanium(IV) phosphates which are obtainable by the reaction of titanium(IV) compounds with phosphoric acids or their alkali metal salts and in which at least 95% by weight of the polymeric particles have a particle diameter of less than 200 nanometers (nm).

Titanium(IV) compounds which are suitable starting materials for use according to the invention are those described in U.S. Patent Specification No. 2,310,239.

Suitable acids and phosphates to be reacted with the titanium(IV) compounds in the presence of water at a pH value within the range of from 6 to 12 are described in German Unexamined Patent Application No. 37 31 049 and correspond to one of the general formulae (I) to (III):

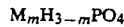

$$M_mH_{3-m}PO_4 \quad \text{(I)},$$

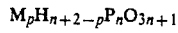

$$M_pH_{n+2-p}P_nO_{3n+1} \quad \text{(II) and}$$

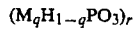

$$(M_qH_{1-q}PO_3)_r \quad \text{(III)},$$

wherein
M represents an alkali metal cation,
m represents 0, 1, 2 or 3,
n represents 2, 3 or 4,
p represents 0, 1, 2 . . . , n+2,
q represents 0 or 1, and
r represents an integer of from 2 to 20.

Surprisingly, it has been found that the addition of specific complexing agents in a low amount during the reaction leading to the polymeric titanium phosphate-wherein the molar ratio of complexing agent to titanium is to be below 1.0 -results in the formation of activating products having significantly improved practical properties. It may be particularly advantageous to add only part of the amount of the complexing agent to the reaction mixture prior to the start of the reaction, together with the titanium starting compound, to add the remainder of the complexing agent after a first initial drying of the reaction product, and then to complete drying.

The reaction may be advantageously carried out in a kneading mixer, particularly at a high solids content in the reaction mixture. A reaction temperature of 75° C. may be sufficient, but a temperature of 80° C. or more is preferred. A temperature of 120° C. can be used without damage to the product, but a temperature of 100° C. or less is preferred. With less highly concentrated reaction mixtures, the preparation may be advantageously carried out in an agitated tank at boiling temperature under normal atmospheric pressure, with subsequent spray drying.

The enhanced efficiency of the activating agents prepared according to the invention is evident, as compared to standard products, particularly in a clearly increased bath capacity which allows an extended useful life of the activating baths to be attained.

Although the activating titanium phosphates according to the invention are practically used in aqueous solution or dispersion, they are preferably marketed in powder form for economic reasons.

The present invention further relates to a process for the preparation of such polymeric titanium(IV) phosphates, in which a titanium(IV)-complexing agent is added to the aqueous preparation comprising the titanium(IV) compound, acid or phosphate, and water, before or during the reaction, in an amount of less than the stoichiometric amount, based on the titanium(IV) content.

According to a preferred embodiment of the present invention, dipotassium hexafluorotitanate is used as the titanium(IV) compound and disodium hydrogen phosphate is used as the alkali metal phosphate, the atomic ratio of titanium to phosphorus being from 1:20 to 1:60 and preferably from 1:25 to 1:40. These atomic ratios of titanium to phosphorus also apply to other less preferred reagents that may be used in the process.

A further preferred embodiment of the present invention is characterized in that there are used, as complexing agents, materials selected from the group consisting of: (a) poly(aldehydocarboxylic acids) and/or their alkali metal salts, the acids being obtainable by the reaction of hydrogen peroxide, acrolein, and acrylic acid and having (a) a viscosity number within the range of from 5 to 50 ml/g, (b) an acid value within the range of from 450 to 670, (c) an acid equivalent weight within the range of from 125 to 70, (d) a setting point of less than 0° C., (e) a content of carboxyl groups within the range of from 55–90 mole % of the total of carboxyl and aldehydo groups, and (f) a molecular weight within the range of from 1,000 to 2000; and (b) 1,1-diphosphonic acids, or salts of 1,1-diphosphonic acids, having the general formula (IV)

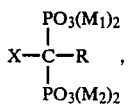

wherein
- R represents either (i) a phenyl group which is unsubstituted or para-substituted by halogen, amino, hydroxy, or a $C_{1-4}$ alkyl group, preferably by Cl or $NH_2$ or (ii) a straight-chain, branched or cyclic saturated or mono- or polyunsaturated alkyl group having from 1 to 10 carbon atoms;
- X represents hydrogen, hydroxy, halogen or amino; and
- $M_1$ and $M_2$ each independently represent hydrogen and/or an alkali metal ion.

In the processes according to the present invention particularly preferred complexing agents are 1,1-diphosphonic acids having the general formula (IV), wherein R represents an unbranched alkyl group having from 1 to 6 carbon atoms.

Sodium salts are preferred as the salts of either poly(aldehydocarboxylic acids) or 1,1-diphosphonic acids.

While in general an amount of complexing agent is used which is lower than the stoichiometric amount, relative to the amount of titanium, in a preferred embodiment of the present invention, the complexing agent is used in an amount of from 0.05 to 0.7 moles per 1 mole of titanium. According to a more preferred embodiment the complexing agent is used in an amount of from 0.1 to 0.6 moles per 1 mole of titanium.

In another preferred embodiment of the process according to the invention, up to 30% by weight of the total amount of complexing agent is added before or during an initial period of reaction of the titanium(IV) compound with alkali metal phosphate, and the remaining amount of complexing agent is incorporated in the reaction mixture only after a first initial drying of the product of the initial reaction to a residual moisture content of from 10 to 20%. The reaction of the titanium(IV) compound with acid or phosphate may usually be carried out in a kneading mixer to dryness or in an agitated tank with subsequent spray-drying. Accordingly, in a further preferred embodiment of the present invention, the reaction of titanium(IV) compounds with acid or phosphate is carried out at temperatures within the range of from 75° C. to 120° C. in a kneading mixer to dryness or in an agitated tank with subsequent spray-drying. Particularly preferred is a process in which the reaction is carried out at temperatures within the range of from 80° C. to 100° C.

The process according to the invention allows a wide variation of the solids contents in the reaction. Accordingly, in a further preferred embodiment of the process according to the invention, the solids content in the reaction is within the range of from 30 to 85%. A particularly preferred embodiment results when the solids content is within the range of from 75 to 85%, if the reaction is carried out in a kneading mixer. If the reaction is carried out in an agitated tank, it is particularly preferred when the solids content is within the range of from 30 to 40%.

The polymeric titanium(IV) phosphates of the present invention have a particle diameter of less than 200 nm. These titanium(IV) phosphates can be mixed with water to make excellent aqueous compositions for the activation of metal surfaces composed of iron, steel, zinc, galvanized iron or steel, aluminum or aluminated steel, prior to phosphating said surfaces with phosphating baths containing zinc ions, and more particularly prior to a so-called low-zinc phosphating procedure. Such activating compositions normally have a solids content within the range of from 0.001 to 10% by weight of the activating titanium phosphates according to the invention.

Thus, the present invention further is embodied in the use of the polymeric titanium(IV) phosphates according to the invention, having a particle diameter of less than 200 nm, in the form of aqueous dispersions as agents for activating metal surfaces composed of iron, steel, zinc, galvanized iron or galvanized steel, aluminum and/or aluminated steel prior to phosphating said surfaces with phosphating baths containing zinc ions. More preferably, such activating agents are used prior to a low-zinc phosphating procedure.

Some poly(aldehydocarboxylic acids) useful according to the invention are commercially available and are marketed, for example, by Degussa AG, Frankfurt (West Germany) under the designations POC OS 20, POC HS 0010, POC HS 2020, POC HS 5060, POC HS 65 120 and POC AS 0010, POC AS 2020, POC AS 5060, or POC AS 65 120. In these names, the designation HS refers to the acid form, and the designation AS refers to the sodium salt form of the poly(aldehydocarboxylic acids). They may be prepared by a specific process developed by the company Degussa, the "oxidative polymerization" of acrolein. In said process, acrolein alone or in admixture with acrylic acid in an aqueous solution is treated with hydrogen peroxide. The $H_2O_2$ acts as a polymerization initiator and a molecular weight modifier. At the same time part of the aldehyde groups of the acrolein is oxidized by hydrogen peroxide to form carboxyl groups. Thereby polymers are formed which have pendant aldehyde and carboxyl groups, namely the poly(aldehydocarboxylic acids).

Information about the above-described preparation of the poly(aldehydocarboxylic acids) and about possible uses thereof are found in a company brochure by DEGUSSA AG under the title "POC-Umweltfreundliche Polycarbonsäuren mit vielfältigen Anwendungsmöglichkeiten", with printing note: CH 215-3-3-582 Vol. In accordance therewith, the poly(aldehydocarboxylic acids) may be used, for example, as hardness stabilizers, which inhibit precipitation of calcium and other alkaline earth metal salts, as inhibitors of deposit formation in sea water deionizing, as dispersing agents for aqueous pigment dispersions which are concentrated in solids, and as builders for washing and cleansing agents. Furthermore in this company brochure there may be found indications of correspondingly relevant patent literature, for example German Patent Specification No. 10 7I 339 (preparation), German Unexamined Patent Application No. 19 04 940 (complex-forming agents), German Unexamined Patent Application No. 19 04 941 (polyoxycarboxylic acids), German Patent Specification No. 19 42 556 (complex-forming agents), German Unexamined Patent Application No. 21 54 737 (rust-preventive treatment), German Unexamined Patent Application No. 23 30 260 and German Patent Specification No. 23 57 036 (preparation).

The poly(aldehydocarboxylic acids) contain moieties of aldehydocarboxylic acids which have been mostly linearly linked via carbon-carbon bonds and have many pendant carboxyl groups, relatively few pendant aldehydo groups, and terminal hydroxyl groups. The chemical constitution thereof is more specifically characterized by the generalized formula (V), in which x, y, and p are all integers.

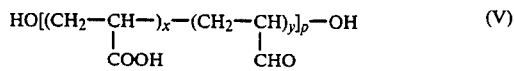

$$HO[(CH_2-CH-)_x-(CH_2-CH)_y]_p-OH \quad (V)$$
$$\quad\quad\quad | \quad\quad\quad\quad |$$
$$\quad\quad COOH \quad\quad CHO$$

However, the steric linkage of the monomer constituents is believed to be atactic, and the sequence of linkage is believed to be random.

The contents of carboxyl and carbonyl groups and the average molecular weight of the various grades of poly(aldehydocarboxylic acids) may be varied by selecting suitable reaction conditions.

The average degrees of polymerization are indicated by the intrinsic viscosities. These are usually between 5 and 50 ml/g, based on 100% solids, measured as a 2% solution in 0.1 NaBr at 25° C. and a pH of 10 in an Ubbelohde viscosimeter, capillary No. 0a. The content of carboxyl groups, expressed herein as mole % COOH out of the total of —COOH and —CHO,, may be calculated from the acid value (DIN 53402("DIN" is an acronym for "Deutsche Industrie-Norm"; copies of complete DIN specifications may be obtained from the DIN Deutsches Institut für Normung in Berlin, Federal Republic of Germany)) of the dried polymers. The acid value of aqueous poly(aldehydocarboxylic acids) is generally unsuitable for calculating the molar percentage of COOH, because the technical grades normally used contain minor amounts of formic acid, acetic acid and β-hydroxypropionic acid as by-products.

The free poly(aldehydocarboxylic acids) can be neutralized with alkali solutions to form the corresponding salts, e.g. with NaOH to form sodium poly(aldehydocarboxylates). The sodium poly(aldehydocarboxylates) will have to be converted into the H form by ion exchange prior to the determination of the acid value.

The titanium(IV) phosphates according to the invention are distinguished from the conventional activating agents—as well as from the products prepared by subsequently admixing with phosphonic acids in high concentration according to the above-mentioned EP-A-No. 0 180 523—because, by the addition of small amounts of complexforming agents before or during the reaction, a product is formed which at concentrations of 0.2% by weight can be rapidly filtered through a membrane filter with a pore width of 200 nm, to produce a filtrate that contains more than 95% of the employed amount of titanium.

If, for example, 0.12 moles of 1-hydroxyethane-1,1-diphosphonic acid (hereinafter briefly denoted as HEDP) per 1 mole of Ti are added to an aqueous reaction mixture containing dipotassium hexafluorotitanate and disodium hydrogen phosphate in a molar ratio of 1:33, prior to kneading at 80° C., after drying an activating agent is obtained which in an applied concentration of 0.2% by weight provides an almost clear aqueous colloidal solution, whereas products prepared without such addition of the complexing agent yield a milky, turbid suspension.

If the 0.2% aqueous preparation of a product according to the invention and of a comparative product are subjected to a pressure filtration through a circular membrane filter with a filter diameter of 100 mm and a pore size of 200 nm, 2 liters of the former preparation can be filtered within a few minutes. The amount of titanium remaining on the filter is about 1% of the amount filtered. The filtration of the comparative product requires several hours, and about 80% of the amount of titanium used remain on the filter. A subsequent addition of phosphonic acid to the suspension to be filtered—as described in the EP-A-No. 0 180 523—does not increase the fraction of the titanium content that can pass through a filter with 200 nm pores.

The above results underscore the surprising finding that upon the addition according to the invention of the complexing agent in an amount of less than the stoichiometric amount to the activating agent before or during the reaction, because of a participation of the complexing agent in the course of the reaction, a product is formed which is qualitatively different from the polymeric titanium(IV) phosphates prepared according to prior art, the product according to the invention being characterized in that a suspension at concentrations suitable for practical use as an activator is filtrable through a membrane filter having a pore size of 200 nm virtually without residue.

As will be further illustrated by the following operating examples, the practical industrial advantage of the polymeric titanium(IV) phosphates—in addition to the effect to provide nearly water-clear activating baths—includes a substantially increased bath useful life or bath capacity, expressed as metal substrate area activated per unit volume of the activating bath and, thus, greater economy and reliability in use.

EXAMPLES

A standard zinc phosphating process described in Table 1 was used for Examples 1 to 9 and for Comparative Examples 1 and 2 to show the influence of the activating agent on the area weight and the morphology of the zinc phosphate layer, and to compare the working performance (bath capacity) of the ready-to-use activating solutions. The applicability of the results thus obtained to other phosphating techniques was confirmed by Examples 10 to 12, wherein a low-zinc phosphating process with spray application, according to Table 3, was employed.

In order to determine the activating effect provided by the polymeric titanium(IV) phosphates prepared according to the invention and by products used for comparison, the surfaces of steel specimens (material St 1405m, dimensions 10 cm×20 cm, about 1 mm in thickness) were phosphated by means of a standardized dipcoat phosphating process according to Table 1. (St 1405m, as described in detail in DIN 1623, is a fully killed steel containing about 0.08% carbon and at least 0.02% of aluminum or other nitrogenbinding material to assure the absence of free nitrogen. St 1405m has high surface smoothness and a matter finish.) The process was selected so that the influence of the polymeric activating agents on the area weights and morphology of the zinc phosphate layer and the capacity of the activating aqueous preparation were elucidated under standard conditions.

The findings as set forth in the Examples may be generalized with respect to the tendencies shown and, thus, are also applicable to other zinc-phosphating processes. This is evident from the Examples 10 to 12 (Table 4) wherein a low-zinc phosphating process with spray application according to Table 3 was employed. As is shown by the Comparative Example 2, the bath capacity of a comparative product, in which HEDP was subsequently added to the application suspension, is significantly lower than that of the product according to the invention.

The "area weight" of the metal phosphate layer is understood to mean the mass of the coating divided by its area and is expressed in grams per square meter and determined according to DIN 50 492.

For the determination of the bath capacity, two liters of a 0.2% aqueous preparation of the activating agent was used in each case for a group of test sheets which were subsequently phosphated. The average area weights of four consecutive test specimens were determined initially and after every tenth test sheet in each group of test sheets. The average values calculated therefrom are set forth in Table 2. The baths were considered to have been exhausted, when ten consecutive sheets in a group, upon being zinc phosphated, exhibited defects or coarsely crystalline regions. The bath capacity is expressed as square meter of activatable area per two liters of activating bath.

EXAMPLES 1 to 7

For the preparation of the activating agents, the starting compounds were reacted in the ratios of amounts as indicated in Table 2. The procedure used is described below in detail for Example 3. The modifications necessary for the other examples, or for other practice of the invention, will be known to those skilled in the art.

The 1-hydroxyethane-1,1-diphosphonic acid (HEDP) was supplied as a 60% by weight aqueous solution (Turpinal$^{(R)}$ SL/Henkel KGaA, Düsseldorf); the tabulated amounts relate to the active ingredient.

A laboratory kneading mixer having sigma blades was charged with 171.4 g of fully deionized (DI) water at 80° C., and 366 g (=2/3 of the total amount eventually used) of $Na_2HPO_4$ were mixed therewith. Then, 28.6 g of $K_2TiF_6$ and 2.9 g of HEDP were added, and the mixture was kneaded for 15 minutes.

Thereafter, the residual amount (183.3 g) of the $Na_2HPO_4$ was added, and the product was kneaded until it began to dry. Then 11.5 g of HEDP were further added, and mixing was continued to dryness.

Examples 1 to 3 are distinguished from each other by the amounts of 1-hydroxyethane-1,1-diphosphonic acid (HEDP) added. In Examples 4 to 7, other 1,1-diphosphonic acids were used as complexing agents.

The results are summarized in Table 2.

EXAMPLE 8

An aqueous suspension comprising 30.93% of $Na_2HPO_4$, 1.59% of $K_2TiF_6$, and 0.4% of HEDP, with the balance to 100% of water, was mixed in a stirred flask at 100° C. for one hour; then another 0.41% of HEDP were added, and the reaction product was spray-dried. The activating agent according to the invention thus obtained had a bath capacity of 4.12 $m^2$ at an average are a weight of 2.1 $g/m^2$ For other results, see Table 2.

EXAMPLE 9

An activating agent was prepared as described above for Example 3, except that as complexing agent a commercially available poly(aldehydocarboxylic acid) in the form of its sodium salt—POC OS 20 from Degussa AG, Frankfurt—was used in the place of HEDP, and that the amounts of reactants were (in the sequence indicated above for Example 3):

171.4 g of DI water; 370.5 g of $Na_2HPO_4$; 28.6 g of $K_2TiF_6$; 2.0 g of POC OS 20; 183.3 g of $Na_2HPO_4$; 7.9 g of POC OS 20 For results, see Table 2.

COMPARATIVE EXAMPLE 1

An activating agent was prepared as described above for Example 3, except that no complexing agent was added. The amounts of reactants and the results obtained are also summarized in Table 2.

COMPARATIVE EXAMPLE 2

A ready-to-use suspension of the comparative product of Comparative Example 1 was subsequently, but without reaction, admixed with 0.5% of HEDP (based on the activating agent employed). The bath capacity amounted to 2.4 $m^2$ for 2 liters of activating bath and, thus, was somewhat higher than that of Comparative Example 1, whereas it was clearly lower than that of the product according to the invention of Example 1 which, moreover, contained a lesser amount of complexing agent.

The results of the technological usage tests of the products of the Examples 1 to 9 and of the Comparative Examples 1 and 2 are set forth in Table 2. As is apparent from Comparative Example 1, an activating agent containing no complexing agent, although it yields acceptable area weights, has only a low bath capacity. In the products according to the invention of Examples I to 9, the bath capacity has been increased, up to more than 400% of that from conventional technology, with improved (i.e. reduced) area weights in several instances. Example 1 furnishes evidence versus Comparative Example 1 of the advantage of adding a small amount of complexing agent (0.12 moles per 1 mole of titanium) prior to the beginning of the reaction. Examples 2 and 3 show the positive effect of a further addition of the complexing agent after intermediately drying the product (to a residual moisture of 10 to 20%).

EXAMPLES 10 to 12

These examples used a low-zinc phosphating procedure with spray application according to Table 3; for results see Table 4.

TABLE 1

| | Treatment steps in the standard phosphating process | | | | |
|---|---|---|---|---|---|
| Stage | Treatment step | Treatment with | Concentration % by weight | Temperature (°C.) | Period of Treatment (min) |
| 1 | Mechanical cleansing and degreasing | absorbent paper | — | 20 | 5 |
| 2 | Chemical cleansing and degreasing | Ridoline ® C 1051[1] | 5 | 80–90 | 5 |
| 3 | Rinsing | Tap water[2] | — | 20 | 1 |
| 4 | Pickling | Chemapix ® ACM[3] | 30 | 20 | 1 |
| 5 | Rinsing | Tap water[2] | — | 20 | 1 |
| 6 | Activation | Activating agent according to Table 2 | 0.2 | 20 | 2 |
| 7 | Phosphating | Granodine ®[4] | 3.0 | 60–70 | 5 |
| 8 | Rinsing | DI water[5] | — | 20 | 1 |
| 9 | Drying | Compressed | — | 20 | to dryness |

TABLE 1-continued

Treatment steps in the standard phosphating process

| Stage | Treatment step | Treatment with | Concentration % by weight | Temperature (°C.) | Period of Treatment (min) |
|---|---|---|---|---|---|
| | | air | | | |

[1] Commercially available, strongly alkaline, phosphate-containing immersion cleaner, from Gerhard Collardin GmbH, Cologne, West Germany
[2] Untreated city water of 18° German hardness
[3] Commercially available rust-removing and descaling agent containing hydrochloric acid and inhibitor, from Gerhard Collardin GmbH, Cologne, West Germany
[4] Commercially available nitrate/nitrite accelerated phosphating agent, from Gerhard Collardin GmbH, Cologne, West Germany
[5] Fully deionized water.

TABLE 2

Composition and performance parameters of activating agents

| Example | Complexing substance type | Amount (%)[1] | KTiF$_6$[2] (%) | Na$_2$HPO$_4$[2] (%) | Area Weight[3] | Capacity[4] |
|---|---|---|---|---|---|---|
| Compar. 1 | No additive | — | 3.8 | 73.4 | 2.2 | 1.7 |
| Compar. 2 | Subsequent addition of HEDP | — | 3.8 | 73.4 | 2.1 | 2.4 |
| 1 | 1-Hydroxyethane-1,1-diphosphonic acid | 0.38 | 0 | 3.8 | 73.0 | 2.6 | 4.0 |
| 2 | 1-Hydroxyethane-1,1-diphosphonic acid | 0.38 | 1.5 | 3.74 | 71.95 | 1.7 | 6.8 |
| 3 | 1-Hydroxyethane-1,1-diphosphonic acid | 0.38 | 0.75 | 3.75 | 72.3 | 2.2 | 4.4 |
| 4 | 1-Hydroxy-1-phenyl-methane-1,1-diphosphonic acid, Na$_2$ salt | 0.38 | 1.5 | 3.7 | 71.95 | 2.0 | 5.2 |
| 5 | 1-Hydroxyhexane-1,1-diphosphonic acid | 0.38 | 1.5 | 3.74 | 71.95 | 1.9 | 6.4 |
| 6 | 1-Amino-1-phenyl-methane-1,1-diphosphonic acid | 0.38 | 1.5 | 3.7 | 71.95 | 2.5 | 8.0 |
| 7 | 1-p-Chlorophenylmethane-1,1-diphosphonic acid | 0.38 | 1.5 | 3.7 | 71.95 | 2.4 | 7.6 |
| 8 | 1-Hydroxyethane-1,1-diphosphonic acid (product spray-dried) | 0.4 | 0.41 | 1.95 | 30.93 | 2.1 | 4.12 |
| 9 | Poly(aldehydocarboxylic acid) (sodium salt) POC OS 20 | 0.38 | 0.92 | 3.7 | 72.44 | 1.9 | 5.2 |

[1] First number: amount added (% by weight) in the beginning of the reaction; second number: amount added after initial drying of the reaction product.
[2] Ratio of amount of the batch of the main components prior to the reaction; the balance to 100% of the indicated amount is fully deionized water.
[3] Average area weight (g/m$^2$), determined in accordance with the description in the text.
[4] Activatable area (in m$^2$) per 2 liters of activating bath containing 0.2% by weight of the activating agent.

TABLE 3

Course of the procedure for testing the activation in a "low-zinc" phosphating process
GRANODINE ® SP 2500/Spray application

| Stage | Treatment step | Product | Concentration (% by weight) | Temperature (°C.) | Period of Treatment (min) |
|---|---|---|---|---|---|
| 1 | Pre-cleaning | Ridoline ® C 1250[1] | 0.5 | 60 | 0.5 |
| 2 | Cleaning | Ridoline ® C 1250[1] | 0.5 | 55 | 2.0 |
| 3 | Rinsing | Tap water[2] | — | 30 | 0.5 |
| 4 | Activating | see Table 4 | 0.1 | 25 | 1.0 |
| 5 | Phosphating | GRANODINE ® SP 2500[3] | 4.2 | 52 | 1.5 |
| 6 | Rinsing | Tap water[2] | — | 35 | 0.5 |
| 7 | Rinsing | Fully desalted water | — | 20 | 0.5 |
| 8 | Drying | Hot air | — | 75 | 10 |

[1] Medium-alkaline phosphate/borate-containing commercial spray/immersion cleaner, from Gerhard Collardin GmbH, Cologne, West Germany
[2] City water of 28° German hardness
[3] Chlorate/nitrate-accelerated "low zinc"-phosphating agent, from Gerhard Collardin GmbH, Cologne, West Germany

TABLE 4

Performance parameters of activating agents in a "low-zinc" phosphating process[1]
The activating effect of the standard product is defined as 100%.

| | | in fully deionized water | |
|---|---|---|---|
| Example | Product[2] | Area weight (g/m$^2$) | Activating effect (%) |
| Comparison | Standard | 3.66 | 100 |
| 10 | 1 | 1.64 | 223 |
| 11 | 5 | 2.19 | 167 |
| 12 | 4 | 2.33 | 157 |

[1] Table 3.
[2] No. of Example from TABLE 2.

What is claimed is:

1. A powdered solid product that when mixed with about 500 times its own mass of water spontaneously yields an aqueous dispersion that comprises polymeric titanium(IV) phosphates and is effective for activating metal surfaces prior to phosphating treatments, at least 95% by weight of the polymeric titanium(IV) phosphate particles in said aqueous dispersion having a particle diameter of less than 200 nanometers.

2. A process for preparing polymeric titanium(IV) phosphates that are suitable for mixing with water to form a dispersion effective for activating the surafces of metals prior to phosphating treatments, said process comprising chemically reacting a mixture comprising:
   (I) a titanium(IV) compound,
   (II) a material selected from the group consisting of phosphoric acid and alkali metal phosphates, and
   (III) water,
to produce said polymeric titanium(IV) phosphates, wherein the improvement comprises the presence in said mixture during at least a part of said reacting of an amount of titanium(IV) complexing agent that is less than the stoichiometric amount, based on the titanium(IV) content of said mixture.

3. A process according to claim 2, wherein component (I) of said mixture is dipotassium hexafluorotitanate and component (II) of said mixture is disodium hydrogen phosphate, said dipotassium hexafluorotitanate and said disodium hydrogen phosphate being present in said mixture in amounts such that the atomic ratio of titanium to phosphorus in said mixture is from about 1:20 to about 1:60.

4. A process according to claim 3, wherein said atomic ratio of titanium to phosphorus is from about 1:25 to about 1:40.

5. A process according to claim 4, wherein said titanium(IV)-complexing agent is selected from the group consisting of:
   (A) poly(aldehydocarboxylic acids) having a chemical structure that can be produced by the reaction of hydrogen peroxide, acrolein and acrylic acid and having:
      (1) an intrinsic viscosity within the range of from about 5 to about 50 ml/g,
      (2) an acid value within the range of from about 450 to about 670,
      (3) an acid equivalent weight within the range of from about 125 to about 70,
      (4) a setting point of less than 0° C.,
      (5) a content of carboxyl grups within the range of from about 55 to about 90 mole % of the total of carboxyl and aldehydo groups, and
      (6) a molecular weight within the range of from about 1,000 to about 20,000;
   (B) alkali metal salts of polyacids as defined in part (A); and
   (C) 1,1-diphosphonic acids and their salts having a molecular structure conforming to the general formula (IV)

   (IV)

wherein R is selected from the group consisting of
   (2) a phenyl group which is para-substituted by a substituent selected from the group consisting of halogen, amino, hydroxy, and $C_{1-4}$ alkyl groups,
   (2) an unsubstituted phenyl group, and
   (3) straight-chain, branched, and cyclic saturated and mono- and polyunsaturated alkyl groups having from 1 to 10 carbon atoms;

X is selected from the group consisting of hydrogen, hydroxy, halogen, and amino; and
each of $M_1$ and $M_2$ is independently selected from the group consisting of hydrogen and alkali metal cations.

6. A process according to claim 2, wherein said titanium(IV)-complexing agent is selected from the group consisting of:
   (A) poly(aldehydocarboxylic acids) having a chemical structure that can be produced by the reaction of hydrogen peroxide, acrolein and acrylic acid and having:
      (1) an intrinsic viscosity within the range of from about 5 to about 50 ml/g,
      (2) an acid value within the range of from about 450 to about 670,
      (3) an acid equivalent weight within the range of from about 125 to about 70,
      (4) a setting point of less than 0° C.,
      (5) a content of carboxyl groups within the range of from about 55 to about 90 mole % of the total of carboxyl and aldehydo groups, and
      (6) a molecular weight within the range of from about 1,000 to about 20,000;
   (B) alkali metal salts of polyacids as defined in part (A); and
   (C) 1,1-diphosphonic acids and their salts having a molecular structure conforming to the general formula (IV)

   (IV)

wherein R is selected from the group consisting of
   (1) a phenyl group which is para-substituted by a substituent selected from the group consisting of halogen, amino, hydroxy, and $C_{1-4}$ alkyl groups,
   (2) an unsubstituted phenyl group, and
   (3) straight-chain, branched, and cyclic saturated and mono- and polyunsaturated alkyl groups having from 1 to 10 carbon atoms;
X is selected from the group consisting of hydrogen, hydroxy, halogen, and amino; and 'each of $M_1$ and $M_2$ is independently selected from the group consisting of hydrogen and alkali metal cations.

7. A process according to claim 6, wherein the titanium(IV)-complexing agent is selected from the group consisting of 1,1-diphosphonic acids and their salts having a molecular structure conforming to the general formula (IV) when R is selected from unbranched alkyl groups having from 1 to 6 carbon atoms.

8. A process according to claim 6, wherein the complexing agent is selected from sodium salts.

9. A process according to claim 6, wherein the complexing agent is used in a total amount of from 0.05 to 0.7 moles per 1 mole of titanium(IV).

10. A process according to claim 2, wherein the complexing agent is used in a total amount of from 0.05 to 0.7 moles per 1 mole of titanium(IV).

11. A process according to claim 10, wherein the complexing agent is used in an amount of from 0.1 to 0.6 moles per 1 mole of titanium(IV).

12. A process according to claim 2, wherein at least about 70% by weight of the total amount of complexing agent is added after (A) an initial period of reaction between the titanium(IV) compound and component (II) of the mixture in the presence of water and (B) a first drying of the product of this initial period of reaction between the titanium(IV) compound and component (II) of the mixture to a residual moisture content of from about 10 to about 20 %.

13. A process according to claim 2, wherein the reaction of titanium(IV) compounds with component (II) of the mixture is carried out at temperatures within the range of from about 75° C. to about 120° C., the reaction is performed in apparatus selected from the group consisting of kneading mixers and agitated tanks, and the reaction, if performed in a kneading mixer, is continued in said kneading mixer to dryness, and, if performed in an agitated tank, is followed by spray-drying.

14. A process according to claim 13, wherein the reaction is carried out at within the temperature range of from about 80° C. to about 100° C.

15. A process according to claim 2, wherein the initial solids content at the beginning of the reaction is within the range of from about 30 to about 85%.

16. A process according to claim 15, wherein the initial solids content is within the range of from about 75 to about 85% and the reaction is carried out in a kneading mixer.

17. A process according to claim 15, wherein the initial solids content is within the range of from about 30 to 40% and the reaction is carried out in an agitated tank.

18. A process comprising activating, by contact with an aqueous dispersion of polymeric titanium(IV) phosphates, a metal surface selected from the group consisting of iron, steel, zinc, galvanized iron and steel, aluminum, and aluminum alloy surfaces, and surfaces of steel coated with aluminum and aluminum alloys, and subsequently phosphating the activated metal surface with a phosphating bath containing zinc ions, wherein the improvement comprises the use for said activating of an aqueous dispersion wherein at least 95% by weight of the polymeric titanium(IV) phosphate in said aqueous dispersion has a particle size of not more than about 200 nanometers.

19. A process according to claim 18, wherein the phosphating is low-zinc phosphating.

20. A process according to claim 19, wherein the aqueous dispersion of polymeric titanium(IV) phosphate used is made by mixing with water a solid product made by a process comprising steps of drying following a step of reacting a mixture of
(I) a titanium(IV) compound,
(II) a material selected from the group consisting of phosphoric acid and alkali metal phosphates, and
(III) water,
to produce said polymeric titanium(IV) phosphates, at least part of said reacting being in the presence of an amount that is less than the stoichiometric amount, based on the titanium(IV) content of the material reacted, of a titanium(IV)-complexing agent.

* * * * *

UNITED STATES PATENT AND TRADEMARK OFFICE
CERTIFICATE OF CORRECTION

PATENT NO. : 4,957,568

DATED : September 18, 1990

INVENTOR(S) : Helmut Endres et al.

It is certified that error appears in the above-identified patent and that said Letters Patent is hereby corrected as shown below:

In Claim 2, Column 13, Line 6, "surafces" should read --surfaces--.

In Claim 5, Column 13, Line 45, "grups" should read --groups--.

In Claim 5, Column 13, Line 62, "(2)" should read --(1)--.

Signed and Sealed this

Fifth Day of May, 1992

Attest:

DOUGLAS B. COMER

Attesting Officer

Acting Commissioner of Patents and Trademarks